April 20, 1948.   C. E. STOLTZ   2,439,912
MECHANICAL SHOVELING MACHINE
Filed March 22, 1946   3 Sheets-Sheet 1
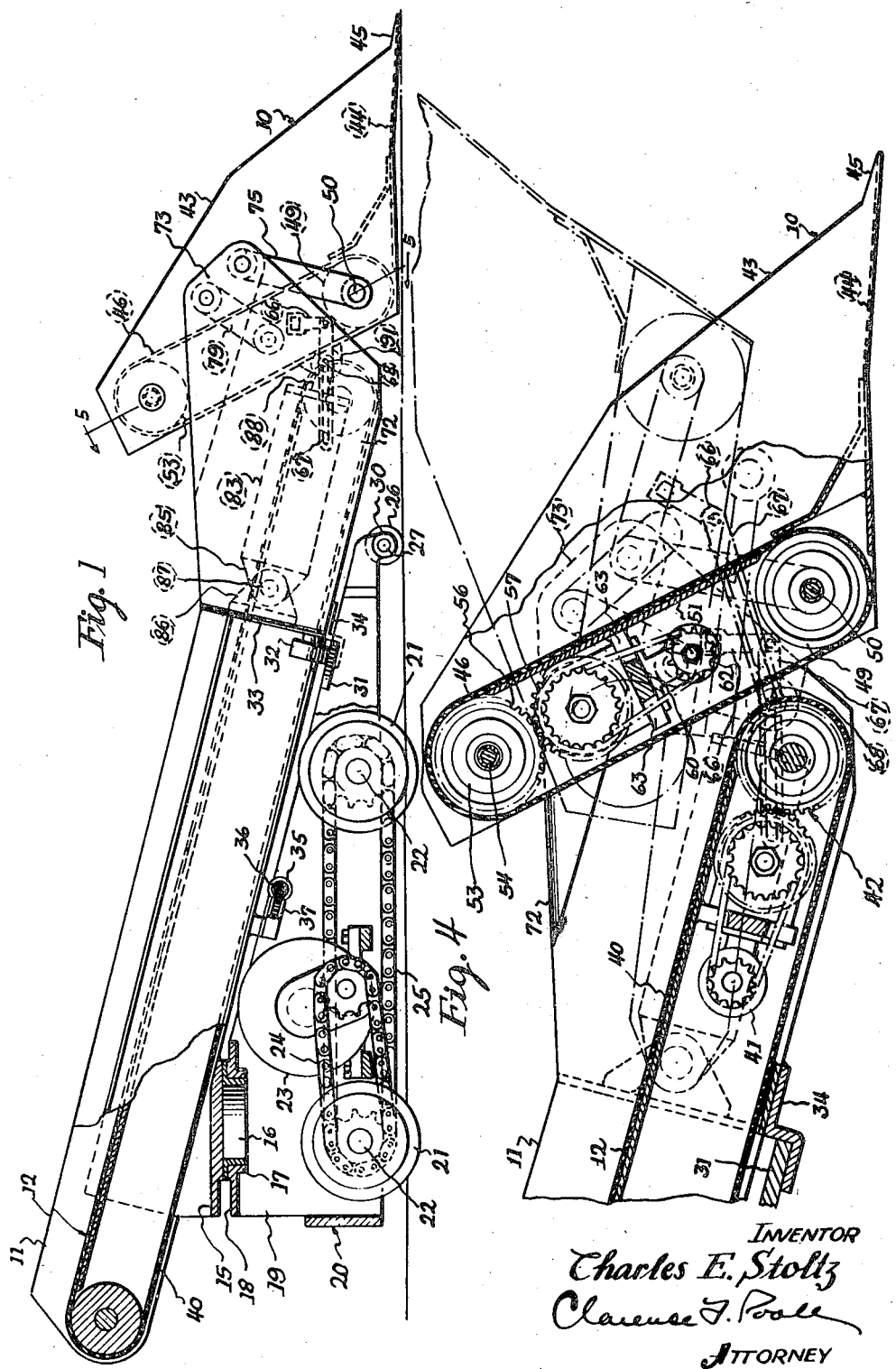
INVENTOR
Charles E. Stoltz
Clarence T. Poole
ATTORNEY

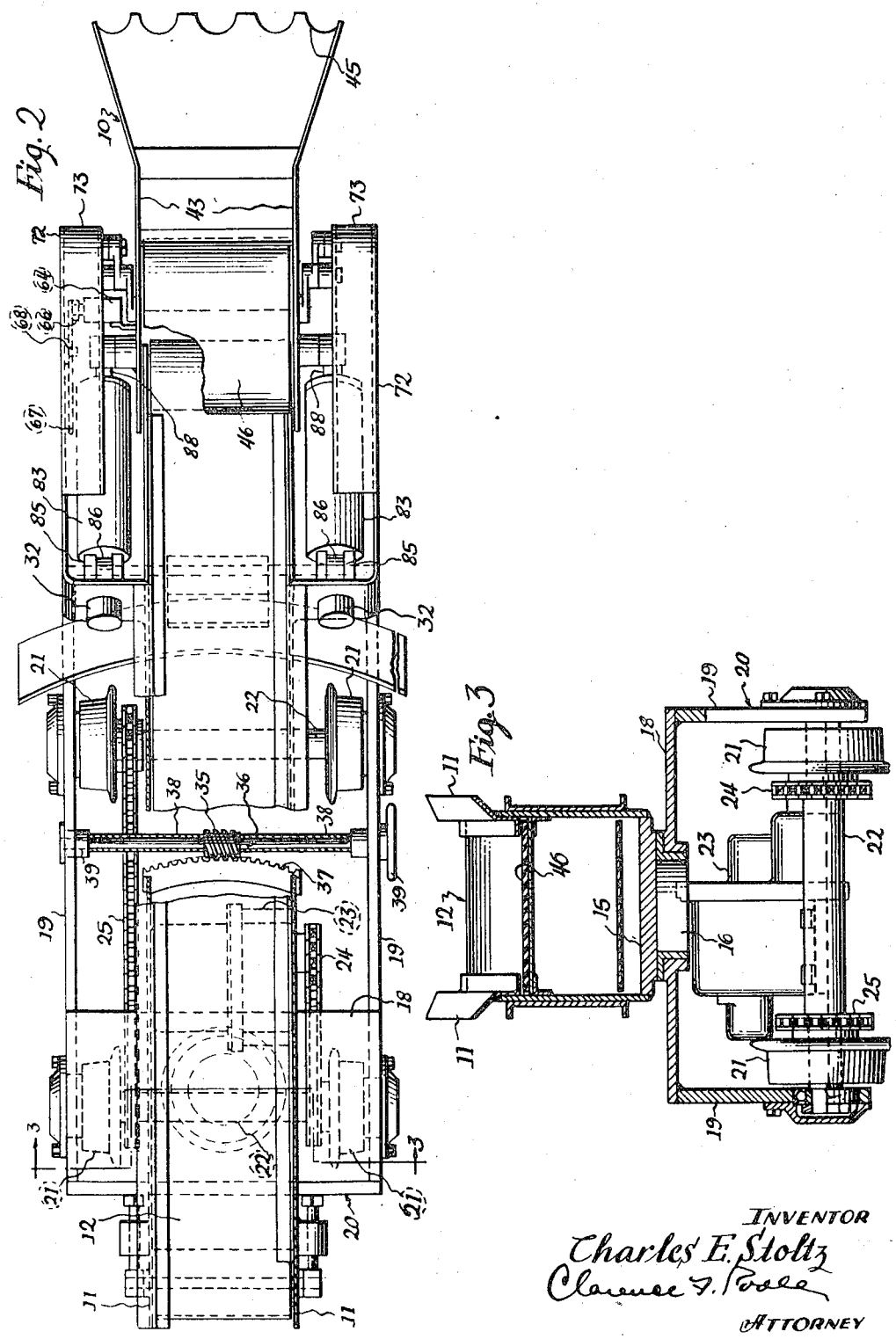

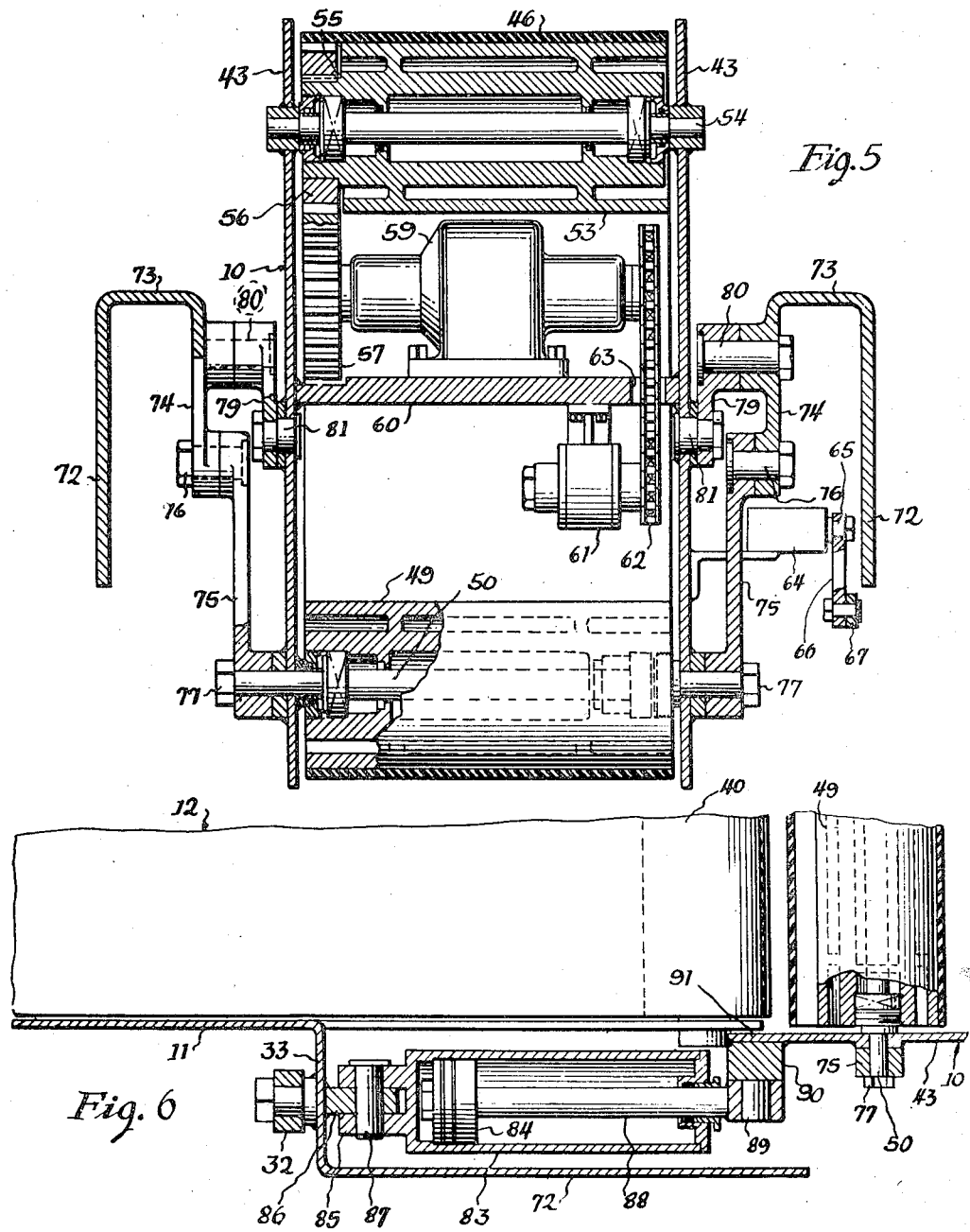

Patented Apr. 20, 1948

2,439,912

UNITED STATES PATENT OFFICE 2,439,912

MECHANICAL SHOVELING MACHINE

Charles E. Stoltz, Chicago, Ill., assignor to Goodman Manufacturing Company, Chicago, Ill., a corporation of Illinois Application March 22, 1946, Serial No. 656,228

10 Claims. (Cl. 214—90)

This invention relates to improvements in mechanical shoveling machines of the type adapted to shovel muck or other loose material underground in mines.

Among the objects of my invention are to provide a novel form of mechanical shoveling machine adapted to shovel muck underground in mines, which is of a low overall height and is of a light, simple and compact construction arranged to efficiently operate in places of low head room.

A more specific object of my invention is to provide a scoop for a shoveling machine of the class described wherein an endless conveyor forms a rear wall of the scoop and is operative when the scoop is being elevated to discharge its load onto the conveyor of the shoveling machine, so as to mechanically clear the scoop of material thereon and provide a self-cleaning scoop which is particularly effective in handling wet and gummy material.

These and other objects of my invention will appear from time to time as the following specification proceeds and with reference to the accompanying drawings wherein:

Figure 1 is a view in side elevation of a shoveling machine constructed in accordance with my invention, with certain parts broken away and certain other parts shown in substantially longitudinal section;

Figure 2 is a plan view of the shoveling machine shown in Figure 1, with certain parts broken away and certain other parts shown in substantially horizontal section;

Figure 3 is a transverse sectional view taken substantially along line 3—3 of Figure 2;

Figure 4 is an enlarged fragmentary longitudinal sectional view taken through the forward part of the machine and showing the scoop and forward end of the conveyor in substantially longitudinal section;

Figure 5 is a fragmentary transverse sectional view taken substantially along line 5—5 of Figure 1; and Figure 6 is an enlarged detail partial fragmentary horizontal sectional view showing certain details of the means for forcing the scoop into the material it is desired to load and for elevating the scoop to a discharge position.

In the drawings the embodiment of my invention illustrated includes generally a shovel or scoop 10 mounted between side plates 11, 11 of a frame for a conveyor 12, and extending in advance thereof, for picking up loose material and muck from the ground and discharging it onto said conveyor.

The frame of the conveyor 12 is provided with a transverse bottom plate 15 disposed adjacent the rear end thereof and having a boss 16 depending therefrom and journaled in a bearing boss 17. Said bearing boss is formed in a plate 18 mounted on and extending across side plates 19, 19 of a truck 20.

The truck 20 is mounted on track wheels 21, 21 and axles 22, 22, which are driven by power from a motor 23 through a chain and sprocket drive 24, operatively connecting said motor with the rear axle 22, and a chain and sprocket drive 25 connecting the front and rear axles together. Said motor may be of any well known form, and is herein shown as being an air motor, and may be used to crowd the scoop 10 into the material it is desired to load, by moving the entire machine forwardly, as well as propel the machine about the mine. A roller 26 extends transversely across the forward end of said truck and is mounted on a shaft 27, mounted at its ends in depending end portions 30, 30 of said side plates. Said roller is adapted to engage the mine rails, or the ground when the forward end of said truck is in advance of the mine rails, to prevent forward tilting movement of said truck during the shoveling operation.

The side plates 19, 19 of the truck 20 are inclined upwardly from the forward end thereof to a point adjacent the forward end of the plate 18 and have an arcuate guide plate 31 mounted thereon, adjacent their forward ends and extending thereacross beyond opposite sides thereof. Rollers 32, 32 mounted in outwardly projecting shouldered portions 33, 33 of the side plates 11, 11 are adapted to rest on said guide plate and support the forward end of the conveyor 12 for lateral movement with respect thereto about the axis of the boss 16. A retaining clip 34 is mounted on the frame for said conveyor, intermediate the side plates 11, 11, and depends therefrom and slidably engages the underside of said guide plate, to prevent upward tilting movement of said conveyor with respect to said truck.

The means for laterally moving the conveyor 12 about the axis of the boss 16 includes a worm 35 mounted intermediate the side plates 19, 19 on a transverse shaft 36, mounted adjacent its opposite ends in said side plates. Said worm meshes with a worm gear segment 37 spaced downwardly from and mounted on the lower ends of the side plates 11, 11 of the frame of the conveyor 12. Sleeves 38, 38 encircle said transverse shaft and are provided to take the thrust on opposite sides of said worm. A hand wheel 39 on the right end of said shaft, when looking from the rear to forward end of the machine, is provided to turn said shaft and swing the conveyor laterally about the axis of the boss 16. While I have herein shown a hand wheel for operating said shaft and worm, it may readily be understood that said shaft may be operated from the motor 23 or from a separate motor mounted on said truck, if desired.

The conveyor 12 is herein shown as being a well known form of belt conveyor including a conveyor belt 40 extending between the side plates 11, 11 of the conveyor frame, and driven from an air motor 41, mounted between the upper and lower runs of said belt. The drive from said air motor to said conveyor belt includes a chain and sprocket drive and a gear train generally indicated by reference character 42 (see Figure 4).

The scoop 10 has a pair of parallel spaced side walls 43, 43 connected to and extending upwardly from a bottom plate 44 thereof. Said bottom plate extends in advance of said side walls and has a forward digging lip 45 adapted to dig into and pick up loose material from the ground. An endless conveyor belt 46 is herein shown as being mounted between said side walls and as forming a rear wall portion of said scoop.

The endless conveyor belt 46 is herein shown as being trained around an idler roller 49 at the lower end of said scoop. Said idler roller is journaled on a transverse shaft 50 mounted at its ends in the side walls 43, 43 of said scoop and extending laterally therefrom (see Figure 5). From said idler roller said belt extends over a backing plate 51 mounted between the side walls 43, 43 and extending upwardly therealong to a position adjacent a drive roller 53 around which said belt is trained (see Figure 4). Said drive roller is suitably journaled on a transverse shaft 54, mounted at its ends in the side walls 43, 43.

The drive roller 53 has a shouldered end portion 55, herein shown as having a spur gear 56 keyed thereon (see Figure 5). Said spur gear 56 meshes with and is driven from a spur gear 57 driven from a speed reducer 59. Said speed reducer may be of any well known form and is not herein shown or described in detail since it is no part of my present invention. As herein shown, said speed reducer is mounted on the upper side of a plate 60 extending across the side walls 43, 43 and secured thereto as by welding. A motor 61, herein shown as being an air motor, is mounted on the opposite side of said transverse plate 60 from said speed reducer, and drives said speed reducer through a chain and sprocket drive 62 extending through open portions 63, 63 of said plate. A valve 64 spaced outwardly from and mounted on the outside of the side wall 43 adjacent the chain and sprocket drive 62, is provided to supply air to operate said fluid motor.

The valve 64 is herein shown as being a rotary type of valve, including a valve stem 65 having an operating link 66 mounted on its outer end and depending therefrom. A link 67 is pivotally connected to the lower end of said link. Said link 67 is longitudinally slotted, and a pin 68 extending inwardly from a plate 72 of the conveyor frame extends through the slotted portion thereof. Said links and the slotted portion of said link 67 are so arranged that when the scoop 10 is in the lowered position shown in Figures 1 and 4, the valve 64 will be closed to prevent the supply of air to said motor, and the conveyor belt 46 will form a stationary rear wall for said scoop. This will avoid injuring said belt by abrasion that might be caused if said belt were in operation and were rubbing against the relatively heavy rock on said scoop during the crowding of said scoop into the material it is desired to load.

As the scoop 10 moves forwardly to pick up its load from the ground and moves upwardly towards a discharge position and the angle of said conveyor approaches the angle when material will no longer slide down along said belt, the pin 68 will engage one end of the slot formed in the link 67. This will cause the link 66 to pivot the valve stem 65 and open said valve, to supply air to said motor 61 and operate said conveyor so as to discharge loose material from said scoop by power, onto the conveyor 12.

The side plates 72, 72 extend forwardly from the shouldered portions 33, 33 in parallel relation with respect to the portions of the side plates 11, 11 extending along the conveyor belt 40. Said side plates each have an upwardly projecting and inwardly turned forward end portion 73 extending in advance of the forward end of said conveyor, which are herein shown as being bent inwardly and as extending rearwardly therefrom, so as to extend inwardly of said side plates 72, 72 in parallel relation with respect thereto, and form inner wall portions designated by reference characters 74, 74 (see Figure 5). Said inner wall portions 74, 74 have opposite sides of the scoop 10 mounted thereon, for forward and upward swinging movement with respect to the conveyor 12. As herein shown, a link 75 is pivotally mounted on each of said inner wall portions on a pivotal pin 76, disposed adjacent the forward end of said inner wall portion. Said links depend from said pivotal pins 76, 76 and are connected at their lower ends to opposite ends of the transverse shaft 50. Nuts 77, 77 threaded on opposite ends of said shaft, are provided to hold said links to said shaft. Links 79, 79 are also pivotally mounted on said inner wall portions 74, 74 on pivotal pins 80, 80. Said pivotal pins are spaced upwardly and rearwardly of the pivotal pins 76, 76. Said links 79, 79 are shorter than the links 75, 75, and depend from their associated pivotal pins and are connected at their lower ends to the outsides of the walls 43, 43 by means of pivotal pins 81, 81, spaced rearwardly and upwardly from the axis of connection of the lower ends of the links 75, 75, to said scoop. Said links 79, 79 are so proportioned and are connected in such relation with respect to the links 75, 75 as to control the path of movement of said scoop and cause said scoop to first move longitudinally forwardly along the ground and then pivot upwardly to a discharge position above and substantially parallel to the plane of the conveyor 12.

Two fluid pressure cylinders 83, 83 having pistons 84, 84 movable therein, are provided to operate the scoop 10 (see Figures 2 and 6). Each of said cylinders has a bifurcated bracket 85 extending rearwardly from its head end. The furcations of said bracket extend along opposite sides of a connecting member 86, extending forwardly from the shouldered portion 33, and are pivotally connected to said connecting member by means of a pivotal pin 87. A piston rod 88 extends from the piston 84 through the piston rod end of said cylinder and is pivotally connected at its outer end to a pivotal pin 89, extending outwardly from a boss 90. Said boss is herein shown as being secured to and extending outwardly from an ear 91, which extends rearwardly of and is herein shown as being formed integrally with an associated side wall 43 of said scoop.

Thus upon the admission of fluid under pressure to the head ends of the cylinders 83, 83, the piston rods 88, 88 will move the scoop 10 rectilinearly forwardly along the ground, to crowd said scoop into the material it is desired to load, and will then pivot said scoop upwardly about its axes of pivotal connection to the links 75 and 79 to the discharge position shown by broken lines in Figure 4. It should here be understood that the motor 23 driving the track wheels 21, 21 may serve to aid said cylinders and pistons in crowding said scoop into the material it is desired to load by bodily moving the entire machine. As said scoop approaches its discharge position, the links 66 and 67 will open the valve 64, to supply air to the motor 61 and operate the conveyor 46 to mechanically discharge said scoop and clean it of material which may have a tendency to adhere thereto. When it is desired to lower said scoop, air is admitted to the head ends of said cylinders 83, 83 to move the pistons 88, 88 rearwardly therealong and return said scoop to the position shown in Figures 1 and 4.

It may be seen from the foregoing that during the crowding and gathering operation, the conveyor 46 is stationary and only starts to operate to discharge material from the scoop 10 as said scoop approaches a discharge position, and again stops as said scoop is moved downwardly into a gathering or crowding position. Said conveyor is thus always stationary when the scoop is in a gathering position. This prevents damage to the belt which would be caused if said belt were traveling and the muck and rock were crowded against said belt during the picking up or crowding operation of said shovel, when said belt is at a relatively steep angle with respect to the ground, and makes it possible for the scoop to clean itself from wet and sticky materials and be ready to pick up its new load, without the usual loss of time required to knock off sticky material from the scoop by hand.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A scoop adapted to be operated by power to pick up loose material from the ground and discharge it onto a conveyor of a loading machine by swinging movement about a transverse axis and having a pair of parallel spaced side walls, a bottom plate having a forward digging edge extending in advance of said side walls and adapted to engage and pick up loose material from the ground, and an endless conveyor independent of said loading machine conveyor and mounted between and within the limits of said side walls and forming a rear wall portion of said scoop, said conveyor being spaced from the axis of swinging movement of said scoop and extending at an obtuse angle with respect to said bottom plate and being operable upon upward movement of said scoop to a discharge position, to discharge material beyond the rear end thereof.

2. A scoop adapted to be operated by power to pick up loose material from the ground and discharge it onto a conveyor of a loading machine by swinging movement about a transverse axis and having a pair of parallel spaced side walls, a bottom plate having a forward digging edge extending in advance of said side walls and adapted to engage and pick up loose material from the ground, and an endless conveyor independent of said loading machine conveyor and mounted between and within the limits of said side walls and forming a rear wall portion of said scoop, said conveyor being spaced from the axis of swinging movement of said scoop and extending at an obtuse angle with respect to said bottom plate and being operable upon upward movement of said scoop to a discharge position, to discharge material beyond the rear end thereof, and a drive motor mounted between the forward and return runs of said conveyor, for driving said conveyor upon movement of said scoop to a discharge position.

3. A scoop adapted to be operated by power to pick up loose material from the ground and discharge it onto a conveyor of a loading machine by swinging movement about a transverse axis and having a pair of parallel spaced side walls, a bottom plate having a forward digging edge extending in advance of said side walls and adapted to engage and pick up loose material from the ground, and an endless conveyor independent of said loading machine conveyor and mounted between and within the limits of said side walls and forming a rear wall portion of said scoop, said conveyor being spaced from the axis of swinging movement of said scoop and extending at an obtuse angle with respect to said bottom plate and being operable upon upward movement of said scoop to a discharge position, to discharge material beyond the rear end thereof, a drive motor mounted between the forward and return runs of said conveyor, for driving said conveyor, control means for said motor, and means connected with said control means, for operating said control means upon elevation of said scoop to a predetermined position, to start said motor and drive said conveyor to discharge onto said first mentioned conveyor.

4. In a mechanical shoveling apparatus of the class described, a truck, a conveyor extending along said truck and mounted thereon for lateral movement with respect thereto, a scoop mounted at the receiving end of said conveyor for advancing and vertical swinging movement with respect thereto about two parallel spaced axes, power means for advancing said scoop into the loose material it is desired to load and for moving said scoop upwardly for discharge onto said conveyor, said scoop having side walls, a bottom wall having a forward digging edge adapted to engage and pick up loose material from the ground and having an endless conveyor independent of said first mentioned conveyor and forming a rear wall portion of said scoop and being spaced from the axes of swinging movement of said scoop and extending at an obtuse angle with respect to said bottom wall and operable upon upward swinging movement of said scoop to discharge material from said scoop onto said conveyor.

5. In a mechanical shoveling apparatus of the class described, a truck, a conveyor extending along said truck and mounted thereon for lateral movement with respect thereto, a scoop mounted at the receiving end of said conveyor for advancing and vertical swinging movement with respect thereto about two parallel spaced axes, power means for advancing said scoop into the loose material it is desired to load and for moving said scoop upwardly for discharge onto said conveyor, said scoop having side walls, a bottom wall having a forward digging edge adapted to engage and pick up loose material from the ground and having an endless conveyor independent of said first mentioned conveyor and forming a rear wall portion of said scoop and being spaced from the axes of swinging movement of said scoop, and a drive motor for said conveyor mounted on said scoop between the forward and return runs of said conveyor, means for controlling operation of said motor, and means connected with said first mentioned conveyor for operating said control means to start said motor and said second mentioned conveyor upon elevation of said scoop to a predetermined position, and to stop said second mentioned conveyor upon the lowering of said scoop to pick up a new load from the ground.

6. In a mechanical shoveling apparatus and in combination with a self-propelled truck, a frame mounted on said truck for pivotal movement with respect thereto about a vertical axis disposed adjacent the rear end of said truck, a conveyor mounted on said frame and extending therealong, a scoop extending in advance of said frame and mounted at the forward end thereof for advancing movement with respect thereto along the ground, for picking up loose material from the ground and for vertical swinging movement with respect thereto about a pair of parallel spaced transverse axes for discharging material from its rear end onto said conveyor, said scoop having side walls, a bottom wall having a forward digging edge adapted to engage and pick up loose material from the ground and having an endless conveyor mounted between said side walls within the limits thereof forming a rear wall portion thereof and extending at an obtuse angle with respect to said bottom wall and disposed wholly outside the axes of swinging movement of said scoop and operable upon upward swinging movement of said scoop to a predetermined position, to discharge material gathered by said scoop onto said conveyor.

7. In a mechanical shoveling apparatus and in combination with a self-propelled truck, a frame mounted on said truck for pivotal movement with respect thereto about a vertical axis disposed adjacent the rear end of said truck, a conveyor mounted on said frame and extending therealong, a scoop extending in advance of said frame, said scoop having side walls, a bottom wall having a forward digging edge adapted to engage and pick up loose material from the ground and having an endless conveyor forming a rear wall portion thereof and extending at an obtuse angle with respect to said bottom wall and operable upon upward swinging movement of said scoop to a predetermined position, to discharge material gathered by said scoop onto said conveyor, two longitudinally spaced depending links pivotally connected to said frame at each side thereof and pivotally connected to said side walls of said scoop at their lower ends, for mounting said scoop for forward and upward swinging movement with respect thereto, and power means operatively connected with a rear portion of said scoop for advancing said scoop forwardly into the material it is desired to load and upwardly about said links, to position said conveyor forming said rear wall portion thereof to discharge material directly onto said conveyor extending along said main frame during upward swinging movement of said scoop.

8. In a mechanical shoveling apparatus and in combination with a self-propelled truck, a frame mounted on said truck for pivotal movement with respect thereto about a vertical axis disposed adjacent the rear end of said truck, a conveyor mounted on said frame and extending therealong, a scoop extending in advance of said frame, two longitudinally spaced depending links pivotally connected to said frame at each side thereof and pivotally connected with said scoop at their lower ends, for mounting said scoop on said frame for forward and upward swinging movement with respect thereto, said scoop having side walls, a bottom wall having a forward digging edge adapted to pick up loose material from the ground and having an endless conveyor forming a rear wall portion thereof and extending at an obtuse angle with respect to said bottom wall, and operable upon upward movement of said scoop to a predetermined position, to discharge material gathered by said scoop onto said conveyor, and fluid pressure cylinder and piston means connected between said frame and said scoop for advancing said scoop forwardly into the material it is desired to load and for swinging said scoop upwardly about said links, to position said conveyor forming said rear wall portion of said scoop to discharge material directly onto said conveyor which extends along said main frame, during upward swinging movement of said scoop.

9. In a mechanical shoveling apparatus and in combination with a self-propelled truck, a frame mounted on said truck for pivotal movement with respect thereto about a vertical axis disposed adjacent the rear end of said truck, a conveyor mounted on said frame and extending therealong, a scoop extending in advance of said frame, said scoop having side walls, a bottom wall having a forward digging edge adapted to engage and pick up loose material from the ground and having an endless conveyor forming a rear wall portion thereof and extending at an obtuse angle with respect to said bottom wall and operable upon upward swinging movement of said scoop to a predetermined position, to discharge material gathered by said scoop onto said conveyor, two longitudinally spaced depending links pivotally connected to said frame at each side thereof and pivotally connected to said side walls of said scoop at their lower ends, for mounting said scoop for forward and upward swinging movement with respect thereto, and two fluid pressure cylinders and pistons connected between said frame and opposite sides of said scoop rearwardly of the rear end thereof and between the points of connection of said links to said side walls for advancing said scoop about said links forwardly into the material it is desired to load and upwardly about said links, to position said conveyor forming said rear wall portion of said scoop to discharge material directly onto said conveyor extending along said main frame during upward swinging movement of said scoop.

10. In a mechanical shoveling apparatus and in combination with a self-propelled truck, a frame mounted on said truck for pivotal movement with respect thereto about a vertical axis disposed adjacent the rear end of said truck, a conveyor mounted on said frame and extending therealong, a scoop extending in advance of said frame, said scoop having side walls, a bottom wall having a forward digging edge adapted to engage and pick up loose material from the ground and having an endless conveyor forming a rear wall portion thereof and extending at an obtuse angle with respect to said bottom wall, two longitudinally spaced depending links pivotally connected to said frame at each side thereof and pivotally connected to said side walls of said scoop at their lower ends, for mounting said scoop for forward and upward movement with respect thereto, power means operatively connected with a rear portion of said scoop for advancing said scoop forwardly into the material it is desired to load and upwardly about said links, to position said conveyor forming said rear wall portion thereof to discharge material directly onto said conveyor extending along said main frame, during upward swinging movement of said scoop, a drive motor mounted on said scoop between the forward and return runs of said conveyor which forms the rear wall portion of said scoop, a drive connection from said motor to said conveyor, control means for said motor, and means connected between said frame and said control means for operating said control means, to start said motor and drive said second mentioned conveyor to discharge onto said first mentioned conveyor upon elevation of said scoop to a predetermined position, and to stop said second mentioned conveyor upon lowering of said scoop to pick up a new load from the ground.

CHARLES E. STOLTZ.

REFERENCES CITED

The following references are of record in the file of this patent:

UNITED STATES PATENTS

| Number | Name | Date |
|---|---|---|
| 1,297,486 | Murray | Mar. 18, 1919 |
| 1,313,221 | Jackson | Aug. 12, 1919 |
| 1,509,646 | French | Sept. 23, 1924 |
| 1,739,624 | Whamond | Dec. 17, 1929 |
| 1,749,968 | Blair | Mar. 11, 1930 |
| 2,384,242 | Fitch | Sept. 4, 1945 |
| 2,279,529 | Royle | Apr. 14, 1942 |